United States Patent

Suzuki et al.

Patent Number: 6,147,708
Date of Patent: *Nov. 14, 2000

[54] ELECTRONIC STILL IMAGE CAMERA APPARATUS

[75] Inventors: Takeshi Suzuki; Yoshiaki Satoh, both of Tokyo, Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/701,187

[22] Filed: Aug. 21, 1996

Related U.S. Application Data

[63] Continuation of application No. 08/234,351, Apr. 28, 1994.

[30] Foreign Application Priority Data

Apr. 28, 1993 [JP] Japan .................................. 5-102140
Jul. 20, 1993 [JP] Japan .................................. 5-201107

[51] Int. Cl.⁷ .................................................. H04N 5/76
[52] U.S. Cl. .................... 348/232; 358/402; 358/906; 358/909.1
[58] Field of Search .................... 348/222, 232, 348/233, 231, 7, 13, 14, 18, 17, 15; 379/355, 356, 358, 359, 361, 110; 358/906, 909.1, 335, 402, 404, 474, 483; H04N 5/76, 5/228

[56] References Cited

U.S. PATENT DOCUMENTS

| | | | |
|---|---|---|---|
| 4,720,849 | 1/1988 | Tayama | 379/90 |
| 5,057,924 | 10/1991 | Yamada et al. | 348/231 |
| 5,073,927 | 12/1991 | Grube | 379/53 |
| 5,140,434 | 8/1992 | Van Blessinger et al. | 358/335 |
| 5,170,262 | 12/1992 | Kinoshita et al. | 358/335 |
| 5,206,731 | 4/1993 | Takaiwa et al. | 358/209 |
| 5,231,501 | 7/1993 | Sakai | 358/209 |
| 5,260,776 | 11/1993 | Taguchi et al. | 358/41 |
| 5,268,768 | 12/1993 | Terasaka | 358/440 |
| 5,379,124 | 1/1995 | Ikegaya et al. | 358/444 |
| 5,384,842 | 1/1995 | Tapping et al. | 379/387 |
| 5,396,269 | 3/1995 | Gotoh et al. | 379/53 |
| 5,438,359 | 8/1995 | Aokl | 348/207 |
| 5,483,591 | 1/1996 | Koma | 379/356 |
| 5,617,138 | 4/1997 | Ito et al. | 348/222 |

*Primary Examiner*—Michael H. Lee
*Attorney, Agent, or Firm*—Pillsbury Madison & Sutro LLP

[57] ABSTRACT

An image processing apparatus for taking pictures and storing them in an applied storage device generates and outputs an image signal photoelectrically converted from an image incident thereon, transmits and/or receives image information generated in this apparatus or other equivalent apparatus, while an operation mode of the apparatus is set for operation, and stores the telephone number of a destination in a predetermined address of an applied solid state memory means in which the telephone number is capable of being maintained without any power source.

2 Claims, 9 Drawing Sheets

FIG. 9A
 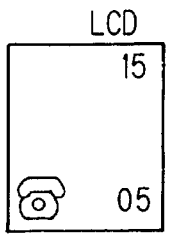
FIG. 9B
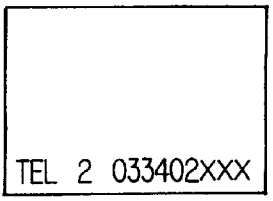 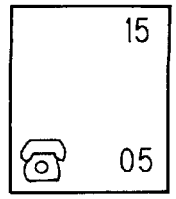
FIG. 10A
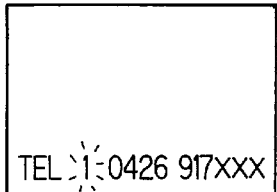 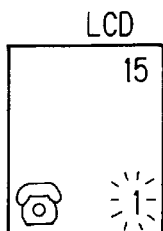
FIG. 10B
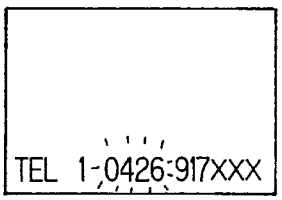 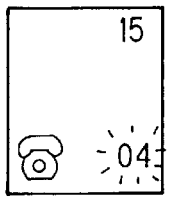
FIG. 10C
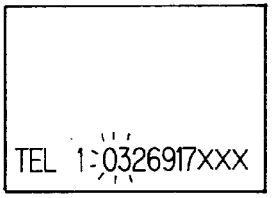 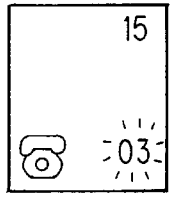
FIG. 10D
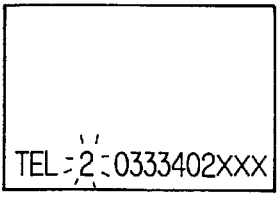 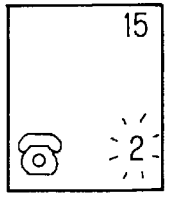
FIG. 10E
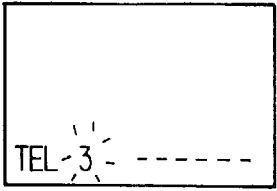 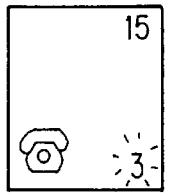

ON MONITOR (EVF)

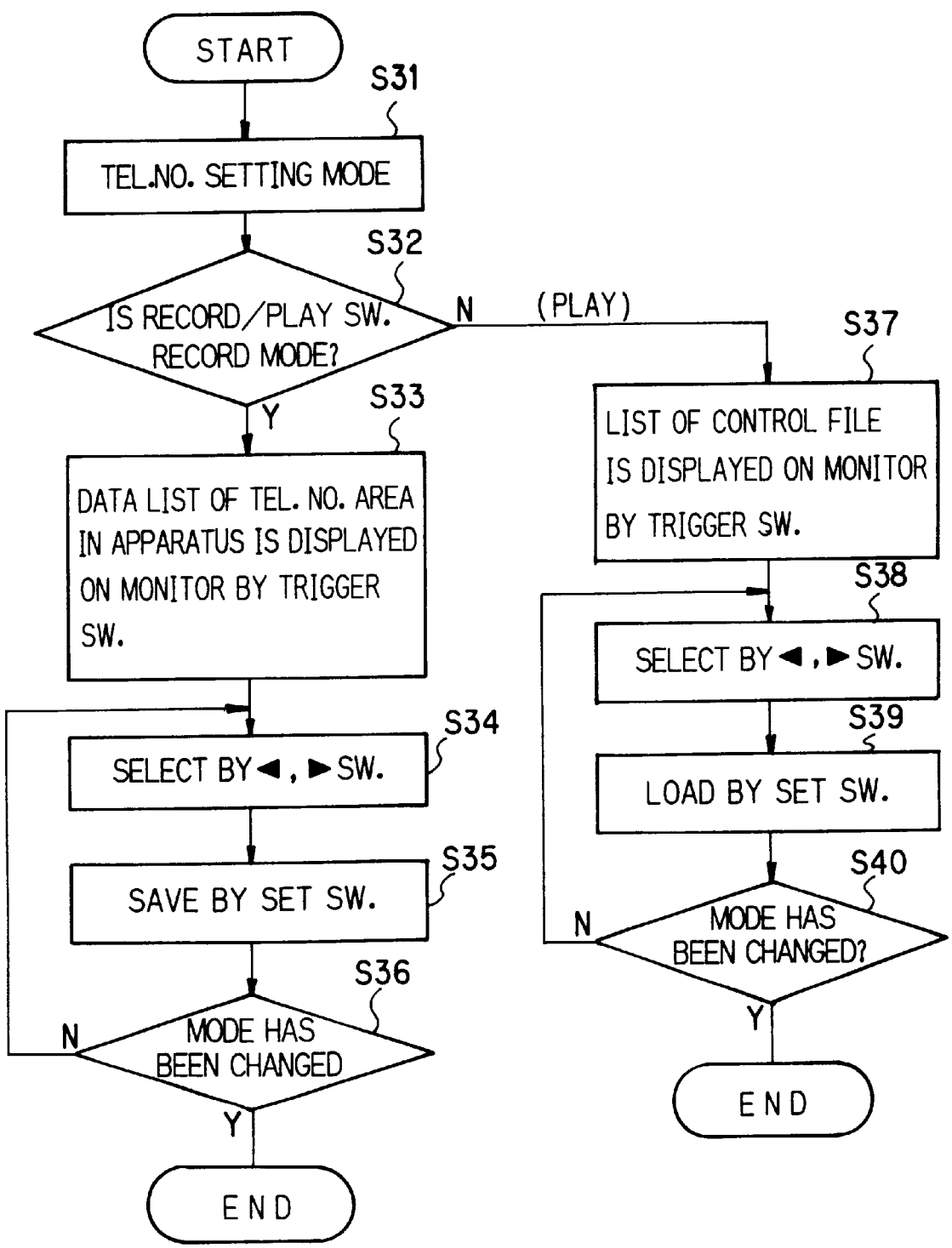

ELECTRONIC STILL IMAGE CAMERA APPARATUS

This is a continuation of application Ser. No. 08/234,351, filed on Apr. 28, 1994.

BACKGROUND OF THE INVENTION

The present invention relates to an image processing apparatus and, more particularly, to an image processing apparatus, which can deal with a plurality of different image display modes which are different in aspect ratio, pixel number, etc.

With the recent advancement of the digitalization of electronic still cameras, there are increasing demands for reproducing and processing photographically picked-up image data with a personal computer (hereinafter abbreviated as PC). Because of the versatility of PCs and like apparatuses, with respect to data, there have been proposed systems in which an IC memory card, for use with a PC or the like, is used as a recording medium for an electronic still camera. The IC memory card records data in PC file format. As to the image format for an electronic still camera, what conforms to the NTSC standard data format (effective pixel number: 768×480) is usually thought to be useful. On the other hand, the pixel number of PCs is usually 640×400, 512×512, 640×480, and so forth.

An electronic still camera conforms in data format to various television signal standards such as the NTSC, PAL, etc. standards. Therefore, when a PC or the like with a smaller pixel number than the standard is used to reproduce image data that is picked-up with an electronic still camera, the overall screen of image data can not be displayed.

In addition, the aspect ratio of a PC display is usually horizontally about 1.2 times that of a electronic still camera CCD image pick-up component. Therefore, image data picked-up with an electronic still camera, when displayed on a PC, results in slightly vertically squeezed images. It is possible to compensate the image data with software or the like on the PC. However, the compensation requires arithmetic operations which undesirably delay reproduction, of the image.

The electronic imaging apparatus as described above, which is for practical use, has the function of transmitting image information to another electronic imaging apparatus via some medium, for instance a telephone line. For image data transmission via a telephone line, it is necessary to dial the telephone number of the destination. Apparatuses for dispensing with the telephone number dialing by the user whenever data transmission is to be made, are disclosed in Japanese Patent Laid-Open Publication H2-25143 and Japanese Patent Laid-Open Publication H3-157083. In this disclosed apparatus, the telephone number of the partner side, i.e., the destination, is recorded on a magnetic disk, on which image information is recorded.

However, where an image to be transmitted is recorded on disk A while the destination telephone number is recorded on disk B, it is necessary to delete the telephone number originally stored on disk A and copy the destination telephone number originally stored on disk B onto disk A as a superseder. This poses problems in operation control properties.

Japanese Patent Laid-Open Publication H3-157083 shows the use of a keyboard as the telephone number input means. However, this is not realistic, particularly when the electronic imaging apparatus is a memory card camera or like small camera, because with such a camera only a restricted number of switches can be mounted.

SUMMARY OF THE INVENTION

An object of the present invention is, therefore, to provide an image processing apparatus capable of processing different modes of image data without any special conversion process or the like.

Another object of the present invention is to provide an image processing apparatus, which can facilitate the destination telephone number setting at the time of image data transmission and which has excellent operation control properties.

According to one aspect of the present invention, there is provided an image processing apparatus for processing image information so as to be adaptable to an applied display device. The image processing apparatus included a discriminating means for discriminating the image data format chosen from among a plurality of image data formats, each defined by corresponding displaying format inclusive of aspect ratio format or pixel number format, on the occasion of recording provided image information in an applied recording medium. The image processing apparatus also includes an auxiliary data recording means for recording auxiliary data representative of the chosen data format in a predetermined area of the recording medium in such a manner that the auxiliary data is capable of being reproduced while maintaining a correlation between the auxiliary data and the corresponding image data.

According to another aspect of the present invention, there is provided image processing apparatus for processing image information so as to be adaptable to an applied display device which includes a discriminating means for discriminating image data format corresponding to a displaying format inclusive of aspect ratio format or pixel number format, based on a reproduced auxiliary data representative of the image data format, on the occasion of reproducing, and an image data format information applying means for applying image data format information representative of discrimination made in the discriminating means so as to determine a reproduced image data format.

According to another aspect of the present invention, there is provided an image processing apparatus being operable in a plurality of operation modes inclusive of a data transmitting mode and data receiving mode. The modes are selectively switched by an user and the image processing apparatus comprises, switching means for selectively switching the operation modes from the data transmitting mode to the data receiving mode or vice versa, responding to a displacement of a predetermined switching member, and display means for displaying whether a present operation mode is the data transmitting mode or the data receiving mode, by a symbolic pointing the display pointing direction which corresponds to the direction of the displacement of the switching member.

According to a further aspect of the present invention, there is provided an image processing apparatus being operable in a plurality of operation modes inclusive of a camera mode for taking a picture and a communication mode for transmitting or receiving image data. The modes are selectively switched by an user and the image processing apparatus comprises, a command switch means for selectively switching operating modes between a recording mode and a play-back mode, in the case where the camera mode is set, and for selectively switching operating modes between a transmitting mode or a receiving mode, in the case where the communication mode is set.

According to still another aspect of the present invention, there is provided an image processing apparatus for taking pictures and storing them in an applied storage device, the apparatus comprising, image pick-up means for generating and outputting an image signal photoelectrically converted from an image incident thereon, communication means for transmitting and/or receiving image information generated in this apparatus or the other equivalent apparatus while an operation mode of the apparatus is set for operation, and storing means for storing the telephone number of the destination in a predetermined address of an applied solid state memory means in which the telephone number is capable of being maintained without any power source.

According to still another aspect of the present invention, there is provided an image processing apparatus for taking pictures and storing them in an applied storage device, the apparatus comprising, image pick-up means for generating and outputting an image signal photoelectrically converted from an image incident thereon, communication means for transmitting and/or receiving image information generated in this apparatus or the other equivalent apparatus while an operation mode of the apparatus is set for communication, storing means for storing telephone number information of the destination in a predetermined address of an applied solid state memory means in which the telephone number is capable of being maintained without any power source, and means for transferring the telephone number information between the predetermined address of the solid state memory means and an auxiliary data file, which file stores auxiliary information data representative of related information for corresponding image information stored in a main file.

Other objects and features will be clarified from the following description with reference to the attached drawings.

BRIEF DESCRIPTION OF THE DRAWINGS

FIG. 9A and FIG. 9B show an example of a display on the EVF 88 and LCD 95 in the transmission mode;

FIG. 10A to FIG. 10E show an example of a display in the telephone number setting mode;

FIG. 12 shows a flow chart representing a telephone number save and load routine.

PREFERRED EMBODIMENTS OF THE INVENTION

Preferred embodiments of the present invention will be described below.

Figure 1:
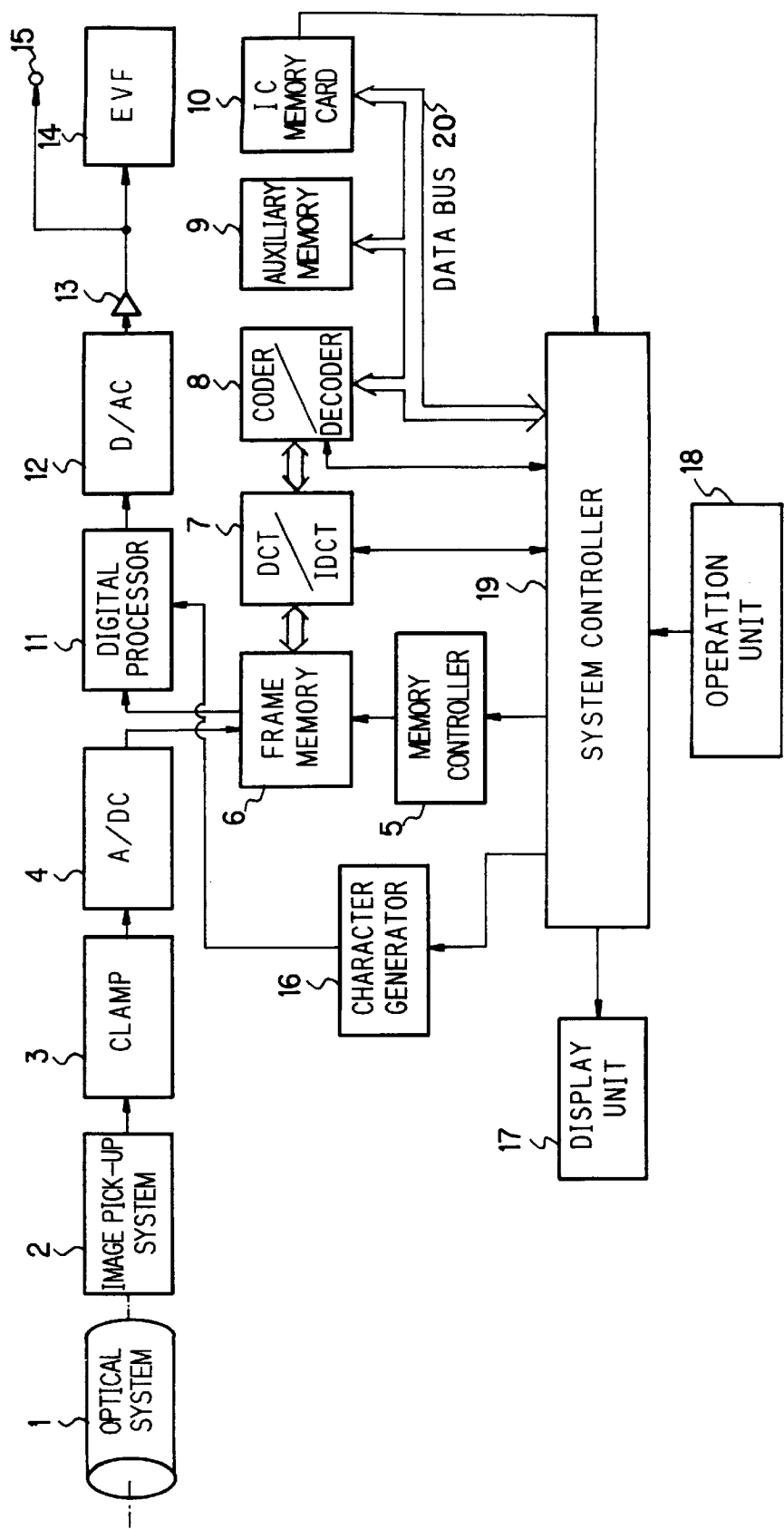
FIG. 1 shows an embodiment according to the present invention applied to an electronic still camera used with an IC memory card as the recording medium.

FIG. 1 shows an embodiment of the present invention applied to an electronic still camera used with an IC memory card as the recording medium. The construction of the embodiment will now be systematically described, along the signal flow, with reference to FIG. 1.

An optical image of an object positioned to be incident on optical system 1 is coupled to image pick-up system 2. Image pick-up system 2 includes a CCD or the like, disposed in an image formed plane, for conversion of the optical image into an analog electric signal. Image pick-up system 2 thus outputs an image picked-up signal, which is held at a constant DC voltage level by clamp circuit 3 and then converted by analog-to-digital converter (hereinafter referred to as A/D converter) 4 into a digital signal, which is written in frame memory 6 to be temporarily stored.

When writing of data in the frame memory 6 has been completed, data is read out therefrom under control of memory controller 5 to discrete cosine conversion circuit (hereinafter abbreviated as DCT, also shown as DCT/IDCT 7 in FIG. 1) for data conversion, which is required for data compression, the converted data being output to coder/decoder 8. The coder/decoder 8 has a coder section, in which video data is compressed with reference to auxiliary memory 9 in which various data and tables necessary for the data compression are written. The compressed data thus obtained is written via data bus 20 in IC memory card 10, which is a data recording means detachably mounted in the electronic still camera.

The description of the electronic still camera will now be continued, along the signal flow in the case of reproducing video data recorded as described above.

Data read out from IC memory card 10 is fed through data bus 20 to coder/decoder 8. In a decoder section of coder/decoder 8, the compressed data described above is decompressed back to the initial data before data compression. The decompressed data is subjected to processing via inverse discrete cosine conversion in DCT/IDCT 7 and then written in frame memory 6. When the decompression process for all data has been completed, data are read out from frame memory 6 under control of memory controller 5 for conversion in digital processor 11 into a video signal conforming to the NTSC, for instance. The video signal is then converted in D/A (digital-to-analog) converter 12 into an analog signal and then 75 Ω impedance matched, for instance, in buffer 13. Then, the image is reproduced in electronic view finder (hereinafter referred to as EVF) 14 such that it can be observed therein. The video signal is also supplied to video output terminal 15.

The electronic still camera includes, in addition to the above elements, character generator 16, which can generate character information about date, time, etc. to be displayed on-screen display unit 17 for displaying various operation modes to be described later, and operation unit 18 for giving the camera various commands causing designated operations. The above various elements are cooperatively controlled by system controller 19.

Data to be recorded on IC memory card 10, or a like recording medium, is subjected before recording to a format conversion to a format which is recognizable on the PC (the DOS format, for instance).

Figure 2:
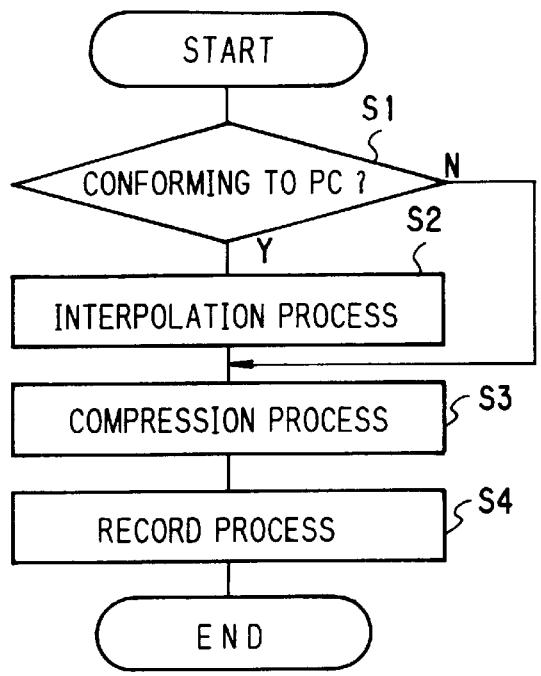
FIG. 2 shows a flowchart representing an operation of recording data with the electronic still camera of FIG. 1.

The operation of recording data with the above electronic still camera will now be described with reference to the flow chart shown in FIG. 2.

When the operation is started, a recognition as to whether the electronic still camera is in a camera mode or in a PC mode, is made depending on the state of recording mode switch 49 (see FIG. 4), which is mounted on operation unit 18, as recording mode recognition means to be described later (step S1). If the PC mode is present, an interpolation process in the vertical direction is executed to obtain data conforming to the aspect ratio of the display for the PC (step S2). Specifically, it is possible to obtain data conforming to the PC display, the aspect ratio of which in the vertical direction is 1.2 times, by sending one line of the same data as that in one of every five lines, for instance, in response to a command from memory controller 5 when the image data written in frame memory 6 is transferred to DCT/IDCT 7. When the camera mode is present, this interpolation is not required and is not executed.

The interpolated image data is then compressed in DCT/IDCT 7 (step S3), and then recorded on IC memory card 10, or a like recording medium, as described above (step S4). At this time, image data of two different formats coexists on the recording medium. Accordingly, an identifier is provided. More specifically, in a leading portion of each image data, a flag indicative of the PC mode or camera mode is provided as header information, which is to be referred to for classification and recognition of data conformity when displaying during play-back or the like.

In the PC mode, for the data classification purpose, extenders may be added to file names used in DOS (disk operating system), for instance "PC" may be added to a PC file, and "CAM" to a camera file. Further, a control file or (otherwise known as "relational file") the like which supervise generally the various kinds of image data may be provided on the recording medium to permit classification and management of image data. In this case, classification can be obtained by writing data in the control file.

Figure 3:
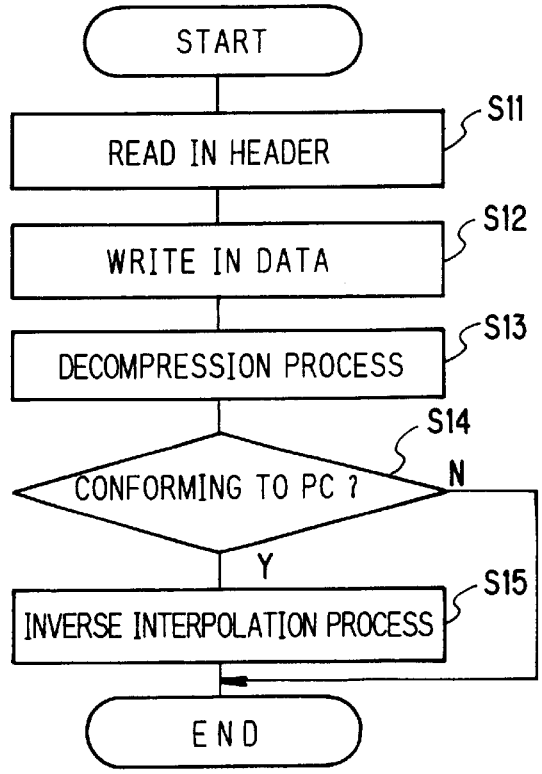
FIG. 3 shows a flowchart representing an operation of reproducing data with the electronic still camera of FIG. 1.

The operation of reproducing data with the above electronic still camera will now be described with reference to the flow chart shown in FIG. 3.

The reproducing operation case will be considered, in which classification data is written in the header. In a play-back mode, data stored in IC memory card 10, or a like recording medium, is read in. At that time, a header in the leading data is first read (step S11), and then the actual image data is read (step S12). Then, the data is decompressed in the decoder section of coder/decoder 8 (step S13) and then subjected to the necessary inverse discrete cosine conversion process in DCT/IDCT 7. Then, system controller 19 makes a decision, from the flag of the header having been read, as to whether the image data is for the camera or PC mode (step S14).

When the data having been read is image data for the PC mode, it is written in frame memory 6 while executing an inverse process to the interpolation process that has been executed at the time of the recording noted above (i.e., inverse interpolation process) (step S15). More specifically, at the time of the recording, after every five lines have been supplied, one interpolation line as noted above is supplied from DCT/IDCT 7. Accordingly, a process of omitting this one extra line is executed under control of memory controller 5 according to a command from system controller 19. Through such inverse interpolation process, the data which has been written in IC memory card 10 with the aspect ratio format conforming to the PC display, can be reproduced without any problem on a monitor conforming to the NTSC standard. If the data having been read is the data for the camera mode, it is directly written in frame memory 6 without executing any inverse interpolation process.

Figure 4:
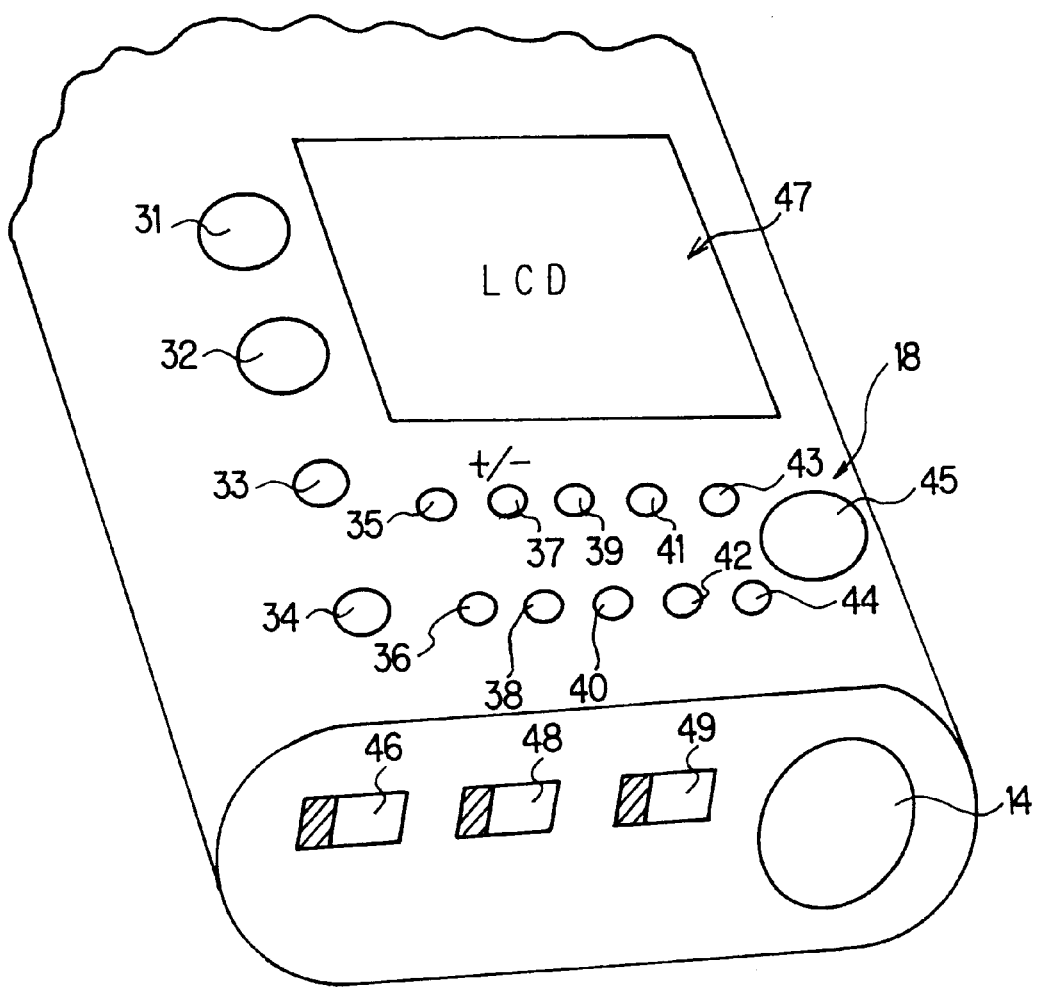
FIG. 4 shows a partial view of the electronic still camera according to the present invention.

The operation of the electronic still camera according to the present invention will now be described with reference to an example of operation unit 18, as shown in FIG. 4.

The electronic still camera, as shown, has its top provided with LCD 47 which constitutes the above described display unit 17 for displaying various states of the camera. On the top left side of LCD 47, zoom tele switch (shown as ZOOMT in FIG. 4) 31 is provided and on the bottom left side of LCD 47 zoom wide switch (shown as ZOOMW in FIG. 4) 32 is provided.

On the same side of zoom switches 31 and 32, up switch (shown as UP in FIG. 4) 33 and down switch (shown as DOWN in FIG. 4) 34 are provided, which are used in the recording mode for the switching of modes, such as white balance, shutter speed, exposure compensation value, power focus, etc., and also for the adjustment of individual values. In the play-back mode, these switches are used for frame feed, frame return and so on.

On the right side of up and down switches 33 and 34, 10 different switches are provided in two rows and five columns. These switches will now be described from the first to the fifth column in succession.

The first column, first row switch is white balance switch (shown as WB in FIG. 4) 35, which is operable in the recording mode for white balance adjustment, for instance switching such white balance modes as an auto mode, a fine day mode, a cloudy day mode, etc. The first column, second row switch is view switch (shown as VIEW, ERASE in FIG. 4) 36, which in the recording mode can cause immediately previous recorded image to be reproduced while it is depressed and in the play-back mode erases the photographed frame. The second column, first row switch is exposure compensation switch (shown as +/− in FIG. 4) 37, which in the recording mode switches exposure modes, for instance, an auto iris mode and a manual iris mode. The second column, first row switch is focus switch (shown as FOCUS in FIG. 4) 38, which in the recording mode switches focus modes, i.e., an AF mode and a power focus mode. The third column, first row switch is strobe switch (shown as Strobe in the FIG. 4) 39, which in the recording mode switches strobe modes, for instance, an auto strobe mode, a strobe-off mode, an external strobe mode, etc. The third column, second row switch is compression mode switch (shown as MODE in FIG. 4) 40, which in the recording mode switches various compression modes as will be described later. The fourth column, first row switch is drive switch (shown as DRIVE in the FIG. 4) 41, which in the recording mode switches recording speed modes, i.e., a self-timer mode, a continuous photograph mode, an interval photograph mode, etc. and in the play-back mode switches play-back speeds, i.e., an interval play-back speed, a continuous play-back speed, etc. The fourth column, second row switch is picture switch (shown as PICTURE in FIG. 4) 42, which in the recording mode switches mainly color hues, color darkness, etc. The fifth column, first row switch is time switch (shown as TIME in FIG. 4) 43, which irrespective of the prevailing mode of the electronic still camera sets up a time setting mode for updating the date, such as year, month, day, time, etc, set by the date function of the camera when it is depressed continuously for 3 seconds, for instance. The fifth column, second row switch is power source switch (shown as POWER in FIG. 4) 44, which on-off switches the power source of the electronic still camera.

Figure 5:
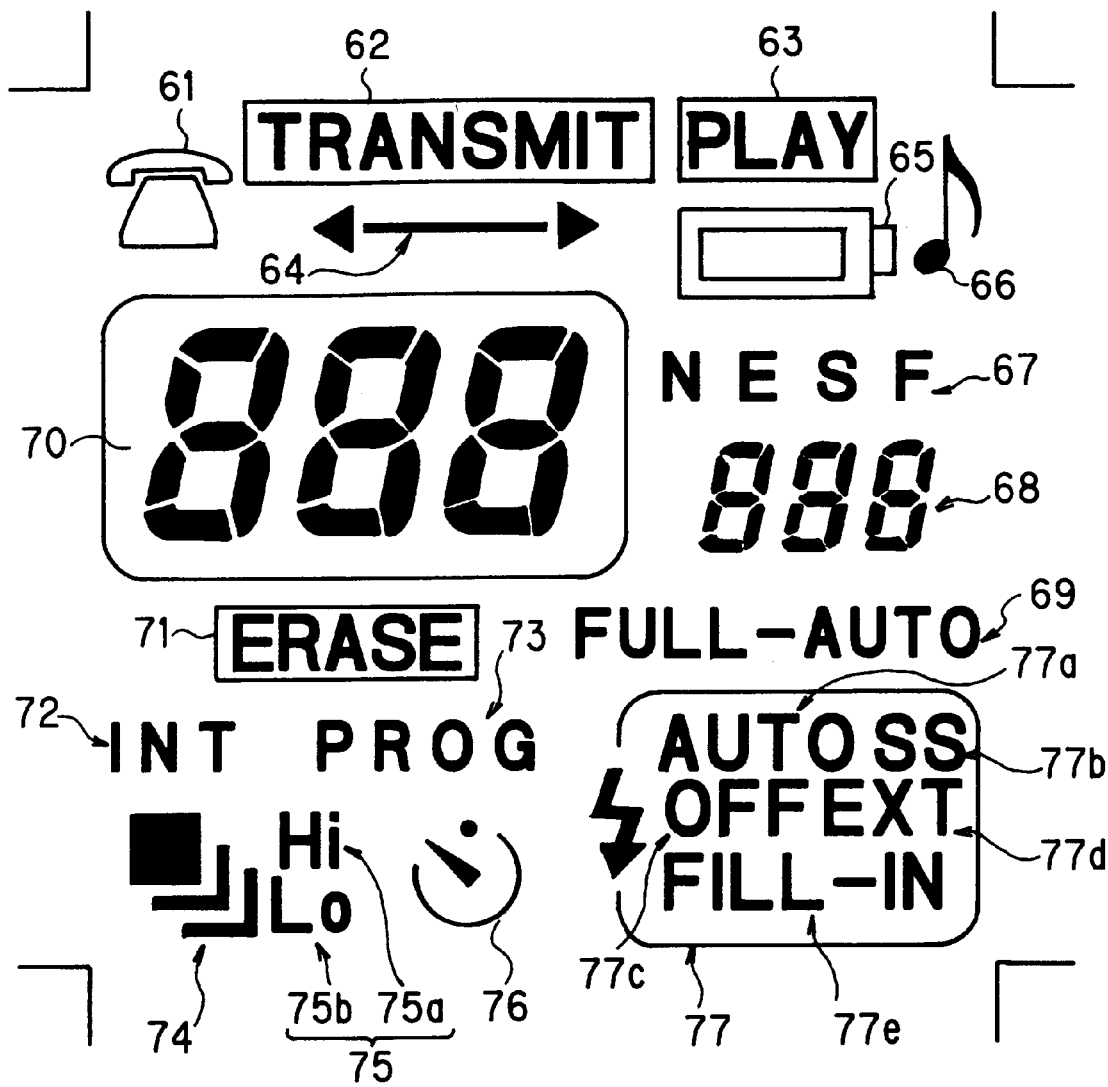
FIG. 5 shows examples of the display on the LCD 47 in FIG. 4.

The time switch 43, more specifically, operates such that when the time setting mode is set up, the year is displayed as a flicker display on LCD 47 in a frame number display section 70 thereof (see FIG. 5). At the same time, in the display on electronic view finder 14, in which the year, month, day, hour and minute are all displayed, the year portion is flickered first of all. The flickering portion can be updated by operating up and down switches 33 and 34. Likewise, whenever time switch 43 is depressed, once again the display of the month, day, time, etc. is sequentially provided afresh as a flicker display. The display thus can be updated with up and down switches 33 and 34. Of course, at this time in electronic view finder 14, the updated portion is likewise flickered. Further, time switch 43 can be also used for on-off switching a timing sound at the time of the start of the recording or various alarm sounds by depressing it for a short period of time instead of holding it depressed for three seconds or more.

On the right side of switches 35 to 44, described above, two-step trigger switch (shown as TRIGGER in FIG. 4) 45 is provided, which is designated AF lock in the first step and start of the recording in the second step.

The rear face of the electronic still camera has auto/manual switch (shown as AUTO/MANUAL in FIG. 4) 46, record/play-back switch (shown as PLAY/CAM in FIG. 4) 48 and camera/PC switch (shown as CAM/PC in FIG. 4) 49, these switches being provided in the mentioned order from the left side. The auto/manual switch 46 is of the slide type and in the recording mode, permits switching of a full auto photograph mode, in which the white balance, focus, exposure adjustment, etc. are all set automatically, and in a manual photograph mode the above settings are manually adjustable. The record/play-back switch 48 is a two-step switch and can set up the recording mode when it is brought to the left and set up the play-back mode when it is brought to the right. The camera/PC switch 49 is of the slide type and in the recording mode, permits switching of the camera and PC modes for recording. On the right side of these switches 46, 48 and 49, electronic view finder (shown as EVF in FIG. 4) 14 is provided.

The apparatus mentioned above is capable of dealing with images digitally and permitting image communication through a telephone line. In this case, the following functions may be assigned to one of the switches in the above switch (constitution in order to provide for improved operation control properties. The record/play-back switch 48, which is for switching between recording mode and play-back mode the case where the camera mode is set, may be assigned the function of switching transmission/reception in the case where the communication mode is set. The trigger switch 45, which is operable to start the photographing in the camera mode, may be assigned the function of initiating the transmission/start of reception in the communication mode. The time switch 43, which is for setting the date and time in the camera mode, may be assigned the function of setting the telephone number of the destination to be transferred. The compression mode switch 40, which is for switching the compression mode in the recording mode, may be assigned the function of switching the play-back/transmission/reception sequentially each time it is depressed. The drive switch 41, which is for switching the photograph modes such as the continuous photograph mode in the camera mode, may be assigned the function of switching, in the transmission mode, a variety of transmission modes, single frame transmission, all frames transmission, programmed transmission, in which certain specific frames are transmitted continuously, etc.

By assigning a plurality of functions to limited switches in the above way, it is possible to obtain a high degree of operation control properties with a simple switch arrangement, i.e., without deteriorating the operation control properties with an increase in the number of switches. The assignment of a plurality of functions to switches, as described above, is made such that the functions provided by the switches can be easily recognized intuitively by the operator, thereby preventing operator confusion.

Now, examples of the display on LCD 47 will be described with reference to FIG. 5.

A telephone mark display 61 and "TRANSMIT" display 62, indicated when they are turned on, constitute a transmission mode display indicative of the transmission mode. When they are turned off, they indicate the normal camera mode.

In the periphery of the underside of the display 62, an arrow mark display 64 is provided. When the transmission mode in which the displays 61 and 62 are turned on is set up, the central bar shape and the left side triangle shape of the display 64 are turned on at a time to display an arrow directed to the left, which indicates a transmission mode of transmitting image data from the electronic still camera to a telephone line. When the central bar shape and the right side triangle shape are turned on at a time, thus displaying an arrow directed to the right, a reception mode is shown, in which image data from the telephone line is received. The direction of the arrow in the display 64 coincides with the slide direction, in which record/play-back switch 48 is slid to switch the transmission and reception in the transmission mode. The display thus can be easily understood intuitively by the operator.

A "PLAY" display 63 is indicative of a play-back mode display, that is, when it is turned on, it indicates that the electronic still camera is in the play-back mode.

A battery mark display 65 under the display 63 is a battery alarm display indicative of the consumption degree of the main battery of the electronic still camera. When the battery is consumed to a certain degree, a right side large block inside the display is turned off, thus making it easily understood that a residual battery quantity remains. When the battery is thoroughly consumed, a left side small block inside the display is also turned off to indicate that the battery is used up.

A musical note mark display 65 on the right side of the displays 63 and 65 is a buzzer display indicative of the "on"/"off" state of a timing sound at the time of the start of the recording or various alarm sounds.

An "N", an "E", an "S" and an "F" display 67 provided under the displays 65 and 66 are for displaying the compression mode set up by the compression mode switch 40. The display "N" indicates a normal compression mode. The display "E" indicates an economical compression mode, of which the compression factor is high compared with normal compression, thus permitting recording of more images. The display "S" indicates a studio compression mode, of which the compression factor is low compared with the normal compression, thus permitting recording of precise images. The display "F" indicates a fine non-compression mode, in which image is recorded without the compression process.

A three 7-segment display 68 under the displays 67 displays the number of residual frames for displaying the residual capacity recordable to IC memory card 10, or like recording medium, in terms of the number of photographed sheets or the like.

A "FULL-AUTO" display 69 under display 68 is for displaying a full-auto mode in the recording mode.

A strobe mode display 77 under display 69 is for displaying various strobe modes. Specifically, "AUTO" display 77a is for displaying an auto strobe mode. An "SS" display 77b is for displaying a slow shutter strobe mode. An "OFF" display 77c is for displaying a strobe off mode. An "EXT" display 77d is for displaying an external strobe mode. A "FILL-IN" display 77e is for displaying a compulsory strobe flash mode.

Returning to the central left portion of the display of LCD 47, the three large 7-segment displays which make up display 70 are enclosed in a frame. In the recording mode display 70, displays the number of frames to be photographed next and in the play-back mode display 70 displays the number of frames being played-back.

An "ERASE" display 71 indicated under display 70 is for displaying an erase mode such as an all erase mode to erase one frame or all frames.

An "INT" display 72 on the left side under portion of display 71 displays an interval mode, i.e., interval recording in the recording mode and interval play-back in the play-back mode.

A "PROG" display 73 on the right side of display 72 displays a programmed mode, i.e., programmed recording in the recording mode and programmed reproduction in the play-back mode.

An overlapped rectangle mark display 74 under display 72 displays a continuous photograph mode to record, for instance, five continuous frames per second in the recording mode.

A display 75, comprising "Hi" display 75a and "Lo" display 75b on the right side of display 74, displays the speed of the continuous photograph mode displayed in display 74 for the interval photograph mode displayed in display 72. The "Hi" display 75a is turned on when the speed is high, while the "Lo" display 75b is turned on when the speed is low.

A mark display 76 on the right side of display 75 displays a self-timer mode.

As a whole, the display area is arranged such that the segments which are turned on in the recording mode are provided on the lower side, while the segments which are turned on in the play-back mode are provided on the upper side, so that the operator can easily recognize the arrangement in the visual sense.

With the embodiment as shown, the operator can photograph the image in the camera mode when it is intended to play-back the data over television while photographing the image in the PC mode when it is intended to take out the image into the PC, thus permitting promptly play-back on the PC of data with the conforming aspect ratio and without need of any special process. In addition, image data obtained by photographing in the PC mode can be played-back using television as it is without being recognized by the operator, and it is possible to easily obtain a data link between the electronic still camera and the PC. Thus, the electronic still camera which has heretofore been mainly thought to be an apparatus for displaying image data on a television monitor, can be provided as a universal image input apparatus, which can provide image data in conformity to various image processing apparatuses in a wide range of fields.

In the above embodiment, structured as shown in FIG. 1, interpolation of image data is made in the vertical direction thereof to obtain aspect ratio conformity. Alternatively, thinning of image data in the horizontal direction thereof may be made to obtain substantially the same effects by substantially the same operation as described above.

Further, while the above embodiment was structured to obtain aspect ratio conformity between the CCD image pick-up component and the PC display, it is of course possible to construct the apparatus to obtain pixel number conformity. In this case, the number of transferred image data pixels is varied instead of the above interpolation process. More specifically, in the PC mode only 640×400 pixels of data, for instance, may be transferred from the frame memory 6 to the DCT/IDCT 7 in response to a command from the memory controller 5. Thus, the data itself is compressed in the pixel number of 640×400 conforming to the mode of display on the PC. Thus, the image data can be displayed or processed without need of any special process on the side of the PC. A certain portion of the normal screen of 768×480 pixels is not transferred in the PC mode mentioned above. Since this portion has nothing to be displayed, it is black in electronic view finder 14 which can be observed at the time of the photographing. In this case, it is suitable to display characters or the like, which are generated in the character generator 16, for instance, and indicative of PC data, in superimposition display on the display-free portion noted above, so that the operator can readily recognize the data to be PC data. Of course, it is possible to easily cope with every number of pixels, such as 512×512 and 640×480 as well as the above pixel number, substantially with the same construction. Furthermore, it is possible to cope not only with the number of pixels for the PC but also with those for the PAL and high resolution TV system.

Meanwhile, in the above embodiment, to cope with the coexistence, in the same recording medium, of normal image data and some other image data such as those for the PC, these various data being of different image formats, a header is provided at the leading of each of the image data, thereby permitting system controller 19 to recognize the format and designate the operation of the camera processing. Such a header, however, is rather obstructive to process when processing or reproducing image data on the PC. Accordingly, a mode in which the header is provided and a mode without provision of any header may be provided for switching by the operator, when desired, in such a manner that the mode without the provision of a header is selected such maintain high data compatibility with the PC. Further, the data processing on the PC side is usually started from the leading of image data and ended in the final thereof. Accordingly, a mode may be suitably provided, in which the header is provided not at the leading but at the final of image data. In this construction, the header is not substantially obstructive on the PC, and nevertheless it is possible to permit the image data format decision on the camera side.

As shown above, according to the present invention, it is possible to permit other image processing apparatuses having different recording statuses to process image data without need of any special data conversion process in these apparatuses.

Further, in the above embodiment several partner destination telephone numbers may be stored such that a first partner destination telephone number is dialed automatically if no special operation is made and that it can be changed to a different partner telephone number by suitable means operable when it is desired to dial such different partner telephone number. As the first partner telephone number, a number may be selected which is most frequently dialed. Doing so can improve operation control properties.

A different embodiment of the present invention will now be described, which can improve the operation control properties.

Figure 6:
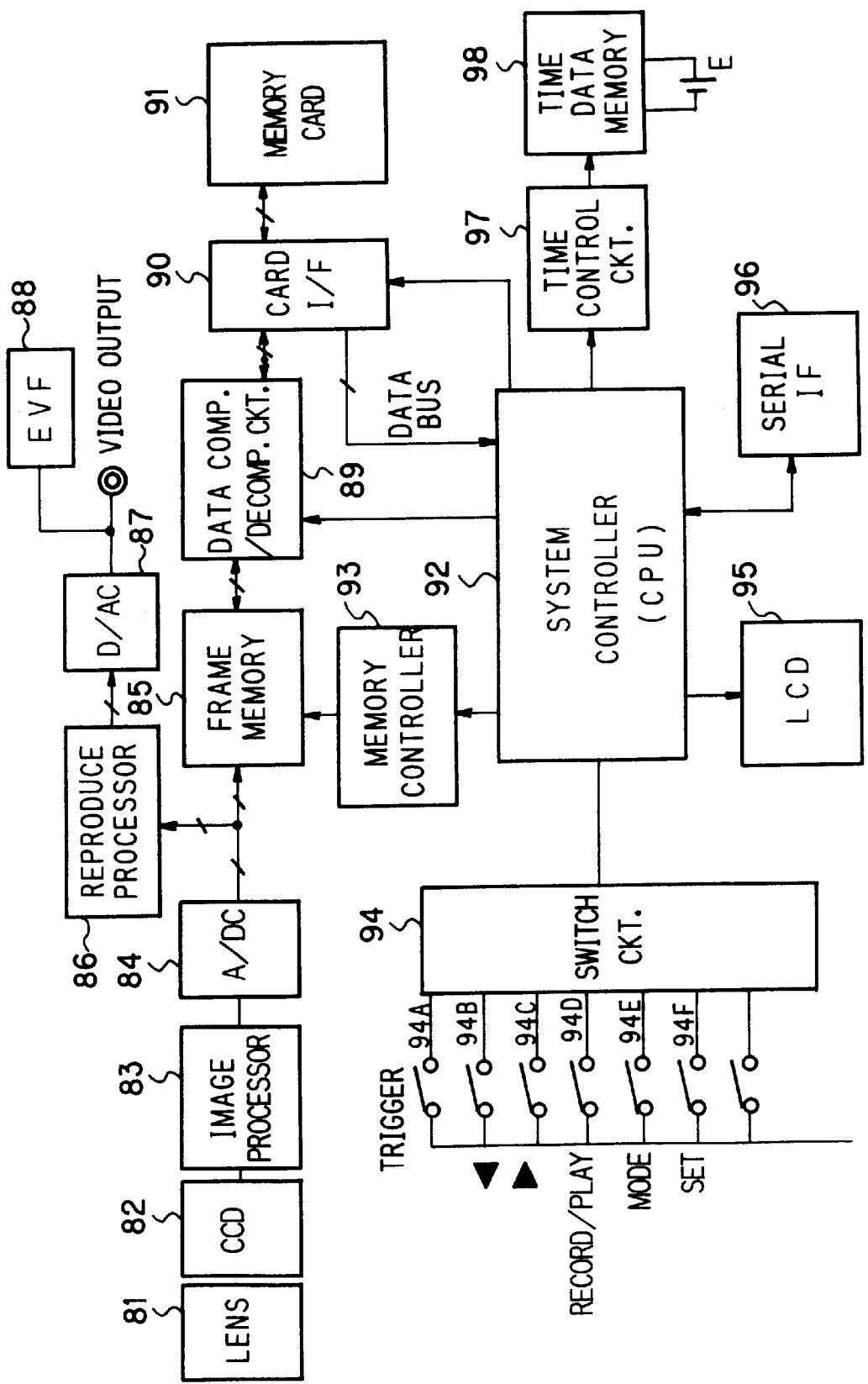
FIG. 6 shows another embodiment according to the present invention which can improve the operation control properties.

As shown in FIG. 6, an object image picked-up via lens 81 and CCD 82 is converted into an electronic signal, which is fed to image signal processor 83 to be processed in a predetermined manner to obtain a video signal. The video signal is converted in A/D converter 84 into a digital signal for recording in frame memory 85. The output of A/D converter 84 is also fed to reproduce processor 86 for a reproduction process and then converted in D/A converter 87 into an analog signal, which is fed to electronic view finder 88 and also to a video output terminal. Video data which is read out from frame memory 85 is compressed in data compressing/decompressing circuit 89 and then fed via card interface (I/F) 90 to memory card 91 for recording.

In reproduction, video data which is read out from memory card 91 via card I/F 90, is decompressed in data compressing/decompressing circuit 89 for recording in frame memory 85.

Video data read out from frame memory 85, like in the above described case, is fed through reproduce processor 86 and D/A converter 87 to electronic view finder 88 and also to the video output terminal.

The frame memory 85 is controlled by memory controller 93, which is operated under control of a control signal output from system controller (CPU) 92. The system controller 92 controls data compressing/decompressing circuit 89, card I/F 90, memory controller 93, etc. by receiving various operation signals from switch circuit 94.

The switch circuit 94 receives the state signals of the following various switches instructing operations of the camera and feeds these signals to system controller 92. Among the various switches are trigger switch 94A for instructing exposure, focus lock, recording, etc., minus and plus feed switches 94B and 94C for selecting play-back image, recording/play-back switch 94D for instructing a recording or play-back operation, mode switch 94E for mode setting, set switch 94F, etc. A LCD 95 displays the operating state of the camera and various pieces of information under control of system controller 92. A serial interface (I/F) 96 transmits and receives data to and from a destination apparatus via a telephone line.

A time control circuit 97 controls time data under control of system controller (CPU) 92. The time data has been stored in time data memory 98 which is supplied with power from back-up power source E. Where time data memory 98 is an E²PROM, the back-up power source E is not required. In time data memory 98 is also stored telephone number data which is supplied in a manner to be described later.

Figure 7:
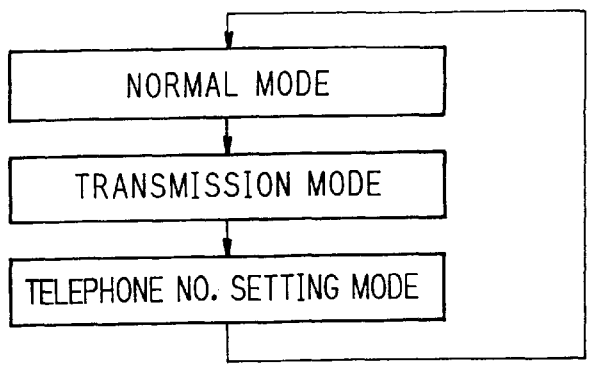
FIG. 7 shows individual modes which are switched one over to another each time the mode switch 94E of FIG. 6 is operated.

Among the operation modes of the electronic imaging apparatus having the above construction are a normal mode, in which image is recorded and played-back, a transmission mode, in which image data is transmitted, and a telephone number setting mode, in which a destination telephone number for image transmission is set. The individual modes are switched one over to another as shown in FIG. 7 each time mode switch 94E is operated.

FIG. 8A to FIG. 8E show an example of a display on EVF 88 and LCD 95 in the normal mode.

Figure 8A:
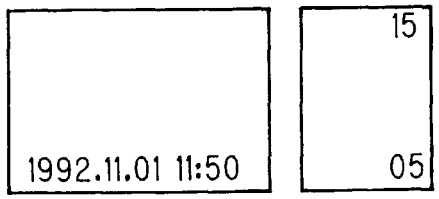
FIG. 8A to FIG. 8E show an example of a display on the EVF 88 and LCD 95 in the normal mode.
Figure 8B:
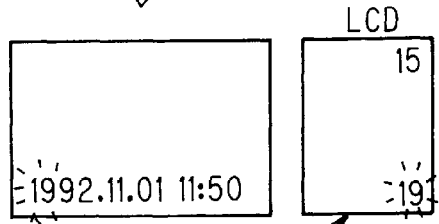
Figure 8C:
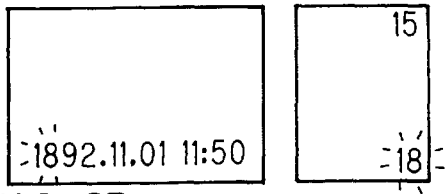
Figure 8D:
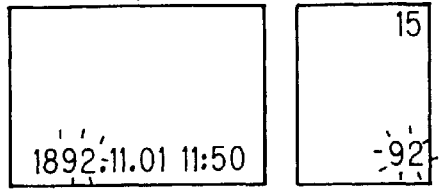
Figure 8E:
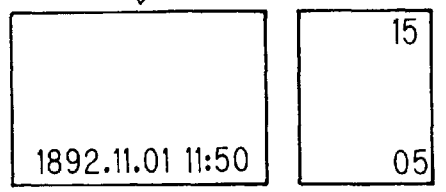

FIG. 8A shows the display in the normal mode. Year, month, day and time are displayed on a bottom portion of an EVF or monitor screen. On the screen of LCD 95, the number of recorded or reproduced image frames (in this example "15") is displayed on a right top portion, and the number of residual frames capable of recording (in this example "05") is displayed on a right bottom portion. When set switch (SET SW) 94F is operated continuously for 5 seconds or more, for instance, the display is changed to one as shown in FIG. 8B. As shown, a two-digit numeral (in this example "19") is flicker displayed on a left bottom portion of the EVF screen. This numeral is also flicker displayed on a right bottom portion of the LCD 95. By operating minus and plus feed switches 94B and 94C, the numeral in the flicker display is changed (to "18" in this example) as shown in FIG. 8C. Then, by depressing set switch 94F display "18" in FIG. 8C is confirmed, and the digits in the flicker display are shifted to the right by two digits, thus flicker displaying numeral "92" as shown in FIG. 8D. Then, by operating set switch 94F continuously for 5 seconds or more, the setting operation is ended, and the confirmed setting date is displayed as in FIG. 8E.

FIG. 9A and FIG. 9B show an example of a display on EVF 88 and LCD 95 in the transmission mode. In the transmission mode, as shown in FIG. 9A, a destination telephone number (for instance "TEL1 0426 917xxx" in this example) is displayed on a bottom portion of EVF 88 (or monitor). The numeral "1" succeeding "TEL" represents the priority number. In LCD 95, a mark (i.e., telephone mark) indicative of the transmission mode is displayed on a left bottom portion. Also, the number of frames of recording or play-back and the number of residual frames available for recording like those in FIG. 8A are displayed on right top and bottom portions. By operating set switch 94F in this state, the telephone number of the next priority order (i.e., the second priority order) is displayed on EVF 88 as shown in FIG. 9B. In this way, destination telephone numbers are successively displayed in response to the operation of set switch 94F.

FIG. 10A to FIG. 10E show an example of a display in the telephone number setting mode.

When the telephone number setting mode is set up, the numeral ("1" in this example) representing the priority order, displayed on a telephone number display section in EVF 88, is flicker displayed as shown in FIG. 10A. At the same time, like flicker display is made on a right bottom portion of LCD 95. This flicker display represents the numeral to be set as the updating numeral. The updating is caused by operating minus and plus feed switches 94B and 94C. The numeral, after the updating, is confirmed by operating set switch 94F, and the flicker display is changed to the numeral part to be updated next ("04" in this example) as shown in FIG. 10B. FIG. 10C shows the display of an updated numeral "03" obtained by operating minus and plus feed switches 94B and 94C. In this state, the numeral may be confirmed by operating set switch 94F.

With such operation of set switch 94F, the telephone number of the second priority order is displayed as shown in FIG. 10D after the setting of the first priority order telephone number. FIG. 10E displays the third priority telephone number that is set. In this stage, the telephone number is not recorded yet. Nor is it displayed on the screen.

Figure 11:
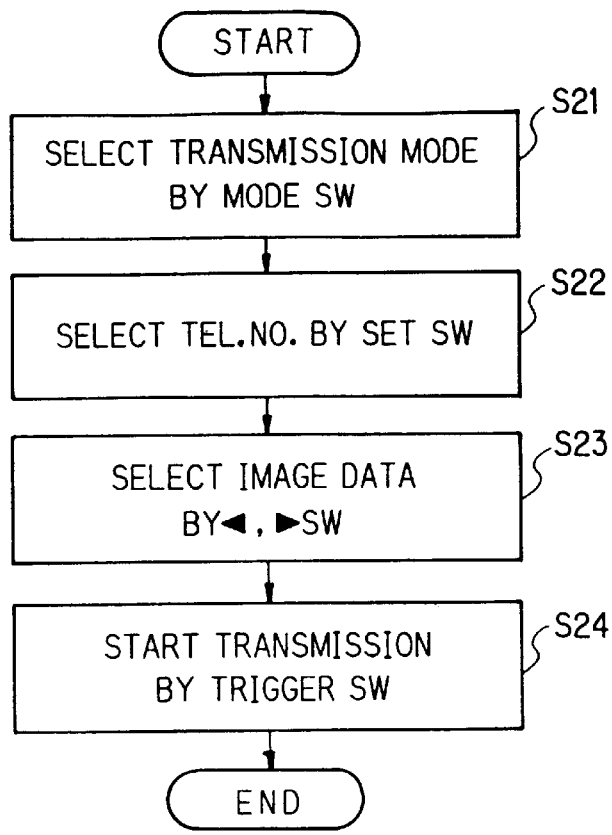
FIG. 11 shows a flow chart of the image transmission routine in one embodiment of the invention.

FIG. 11 shows a flow chart of the image transmission routine in this embodiment. After the start of the routine, the transmission mode is selected with the operation of mode switch 94E (step S21). The telephone number selection is then made by set switch 94F (step S22). Then, image data to be transmitted is selected by minus and plus feed switches 94B and 94C (step S23). Then, a transmission process is started by trigger switch 94A (step S24).

FIG. 12 is a flow chart showing a telephone number save and load routine.

After the start of the routine, the telephone number setting mode is set by mode switch 94E (step S21). Then, a discrimination is made as to whether record/play-back switch 94D is providing the recording mode (step S32). If it is discriminated that the recording mode prevails, a data list of a telephone number area in the apparatus is displayed on a monitor by depressing trigger switch 94A (step S33). Necessary data is then selected with minus and plus feed switches 94B and 94C (step S34). Then, the data is saved from the apparatus into the memory card by set switch 94F (step S35). Then, a discrimination is done as to whether the mode has been changed (step S36). If the mode has been changed, the routine goes back to the step S34. If the mode has not been changed, an end is brought to the routine.

Figure 13:
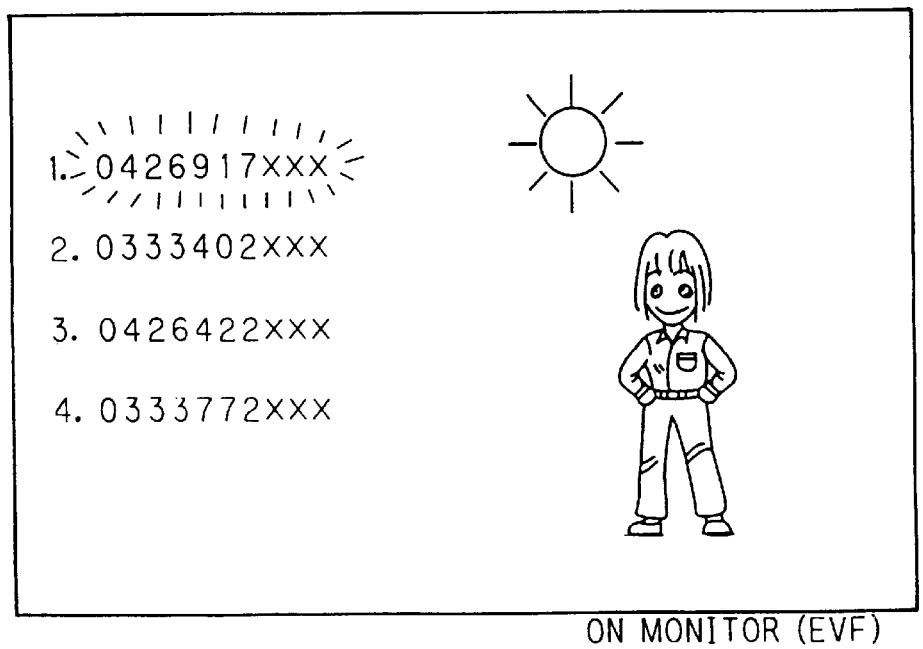
FIG. 13 shows an example of a monitor display of a list in a control file in one embodiment of the invention in the play-back mode thereof.

If it is found in the step S32 that the play-back mode prevails, the control file List is displayed on the monitor by depressing trigger switch 94A (step S37). FIG. 13 shows an example of a display at this time. Then, the necessary telephone number is selected with minus and plus feed switches 94B and 94C (step S38), and then loading of data from the memory card to the data memory area in apparatus is made by the set switch 94F (step S39). At this time, the loaded data may be deleted from the monitor display. Also, if the same telephone number is selected once again, some alarm may be displayed to prevent double selection. Steps S38 and S39 are executed repeatedly until it is discriminated in step S40 that the mode has been changed.

In the above embodiment, the transmitted information of the electronic imaging apparatus may be static image data, sound data or any other data. Further, it may be what is obtained by processing an image signal externally input via the input means in an image signal processor and recording the processed image signal. Still further, it may be what is obtained by recording image data with a different electronic imaging apparatus and storing the data in a medium conforming to the present electronic imaging apparatus.

FIG. 13 shows an example of a monitor display of a list in a control file in this embodiment in the play-back mode thereof.

In the above embodiment, more telephone numbers may be stored by increasing the back-up memory area. In addition, a desired telephone number can be easily selected from among a plurality of telephone numbers. Further, the telephone number setting may be made by operating fewer keys. The procedure of setting is substantially equal to the time setting and is easy for the user. Particularly, when the present invention is applied to a portable electronic imaging apparatus as in the above embodiment, satisfactory portability and operation control properties are obtainable, which contribute to the camera body size reduction.

Moreover, in the telephone number setting mode, it is possible to execute the following function. That is, in response to the depression of the trigger switch where the recording/play-back switch has been switched to the recording side, the contents of the telephone number memory area are stored to the record medium (for instance, memory card) at a time as a that control file, and on the other hand, where the recording/play-back switch has been switched to the play-back side, the contents of the control file are loaded to the telephone number memory area at that time.

We claim:

1. An electronic still camera apparatus for taking pictures and storing them in an applied record medium, said apparatus comprising:

image pick-up means for generating and outputting an image signal photoelectrically converted from an image incident thereon;

mode switch means for switching an operation mode of said electronic still camera apparatus between a normal mode and a transmission mode;

trigger means for commencing a first operation of said electronic still camera apparatus for taking pictures in response to an action of a trigger switch while said normal mode is set by said mode switch means and for commencing a second operation of said electronic still camera apparatus, which is different than said first operation, while said transmission mode is set by said mode switch means;

selecting means for allowing a user to select at least one image;

transmission means for transmitting image information representative of said at least one image selected with said selecting means, in response to an output of said trigger means, while said transmission mode is set by said mode switch means;

storing means for storing telephone number information of a destination in a predetermined address of an applied solid state memory means in which the telephone number is capable of being maintained without any power source; and a housing;

wherein said image pick-up means, said communication means and said storing means are disposed in said housing of said electronic still image camera apparatus.

2. An electronic still camera apparatus for taking pictures and storing them in an applied record medium, said apparatus comprising:

image pick-up means for generating and outputting an image signal photoelectrically converted from an image incident thereon;

mode switch means for switching an operation mode of said electronic still camera apparatus between a normal mode and a transmission mode;

trigger means for commencing a first operation of said electronic still camera apparatus while said normal mode is set by said node switch means and for commencing a second operation of said electronic still camera apparatus, which is different than said first operation, while said transmission mode is set by said mode switch means;

selecting means for allowing a user to select at least one image;

transmission means for transmitting image information representative of said at least one image selected with said selecting means, while said transmission mode is set by said mode switch means;

storing means for storing telephone number information of a destination in a predetermined address of an applied solid state memory means in which the telephone number is capable of being maintained without any power source;

means for transferring said telephone number information between said predetermined address of said solid state memory means and an auxiliary data file which is provided in said applied record medium; and a housing;

wherein said image pick-up means, said communication means and said storing means are disposed in said housing of said electronic still image camera apparatus.

* * * * *